US011865556B2

(12) United States Patent
Hossain et al.

(10) Patent No.: US 11,865,556 B2
(45) Date of Patent: Jan. 9, 2024

(54) OUT-OF-PLANE CURVED FLUIDIC OSCILLATOR

(71) Applicant: Ohio State Innovation Foundation, Columbus, OH (US)

(72) Inventors: Mohammad Arif Hossain, Lake Jackson, TX (US); Jeffrey P. Bons, Dublin, OH (US); James W. Gregory, Columbus, OH (US); Ali Ameri, Solon, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 18 days.

(21) Appl. No.: 17/614,135

(22) PCT Filed: May 28, 2020

(86) PCT No.: PCT/US2020/034882
§ 371 (c)(1),
(2) Date: Nov. 24, 2021

(87) PCT Pub. No.: WO2020/243274
PCT Pub. Date: Dec. 3, 2020

(65) Prior Publication Data
US 2022/0250096 A1 Aug. 11, 2022

Related U.S. Application Data

(60) Provisional application No. 62/854,067, filed on May 29, 2019.

(51) Int. Cl.
*F01D 25/06* (2006.01)
*B05B 1/08* (2006.01)

(52) U.S. Cl.
CPC ............... *B05B 1/08* (2013.01); *F01D 25/06* (2013.01)

(58) Field of Classification Search
CPC .... B05B 1/08; B05B 1/26; B05B 1/10; F01D 25/06; F15C 1/22
See application file for complete search history.

(56) References Cited

U.S. PATENT DOCUMENTS

| 2,916,873 A | 12/1959 | Walker |
|---|---|---|
| 2,943,821 A | 7/1960 | Wetherbee |

(Continued)

FOREIGN PATENT DOCUMENTS

| CA | 2711711 | 2/2012 |
|---|---|---|
| DE | 102017206849 | 10/2018 |

(Continued)

OTHER PUBLICATIONS

International Search Report and Written Opinion, issued by the International Searching Authority (ISA/US) in PCT Application No. US2020/034882 dated Nov. 17, 2020. 12 pages.

(Continued)

*Primary Examiner* — Sabbir Hasan
*Assistant Examiner* — Joshua R Beebe
(74) *Attorney, Agent, or Firm* — Meunier Carlin & Curfman LLC

(57) ABSTRACT

Various implementations include, an out-of-plane feedback-type fluidic oscillator. including a first portion, a second portion, a middle portion coupled between the first portion and the middle portion, and an axis of rotation. The middle portion includes a first side, a second side opposite and spaced apart from the first side, and a middle plane, an interaction chamber, a fluid supply inlet, an outlet nozzle, a first feedback a channel, and a second feedback channel. The first side is coupled to the first portion, and the second side is coupled to the second portion. The first side, the second side, and the middle plane extend circumferentially around the axis of rotation. The middle plane is disposed equally (Continued)

distanced from the first side and the second side. The fluid stream oscillates as it flows through the interaction chamber such that the fluid stream oscillates as the fluid stream exits the outlet nozzle.

24 Claims, 8 Drawing Sheets

(56) References Cited

U.S. PATENT DOCUMENTS

| | | | |
|---|---|---|---|
| 3,117,593 | A | 1/1964 | Sowers, III |
| 3,204,405 | A | 9/1965 | Warren et al. |
| 3,212,259 | A | 10/1965 | Edward |
| 3,228,410 | A | 1/1966 | Warren |
| 3,266,510 | A | 8/1966 | Wadey |
| 3,427,809 | A | 2/1969 | Lavoie |
| 3,448,752 | A | 6/1969 | O'Neill |
| 3,552,415 | A | 1/1971 | Small |
| 3,605,778 | A | 9/1971 | Metzger |
| 3,614,964 | A | 10/1971 | Chen |
| 3,749,317 | A | 7/1973 | Osofsky |
| 4,122,845 | A | 10/1978 | Stouffer |
| 4,463,904 | A | 8/1984 | Bray, Jr. |
| 4,508,267 | A | 4/1985 | Stouffer |
| 4,596,364 | A | 6/1986 | Bauer |
| 4,955,547 | A | 9/1990 | Woods |
| 5,524,660 | A | 6/1996 | Dugan |
| 5,827,976 | A | 10/1998 | Stouffer et al. |
| 5,845,845 | A | 12/1998 | Merke et al. |
| 5,876,182 | A * | 3/1999 | Schulte .......... F01D 5/145 415/115 |
| 6,253,782 | B1 | 7/2001 | Raghu |
| 6,497,375 | B1 | 12/2002 | Srinath et al. |
| 7,036,749 | B1 * | 5/2006 | Steerman .......... B05B 1/08 239/284.1 |
| 7,128,082 | B1 * | 10/2006 | Cerretelli .......... B05B 7/0075 137/833 |
| 7,775,456 | B2 | 8/2010 | Gopalan et al. |
| 8,297,540 | B1 | 10/2012 | Vijay |
| 8,382,043 | B1 * | 2/2013 | Raghu .......... F15D 1/008 244/1 N |
| 8,869,320 | B1 | 10/2014 | Santamarina et al. |
| 9,333,517 | B2 | 5/2016 | Koklu |
| 9,339,825 | B2 | 5/2016 | Koklu |
| 9,802,209 | B2 | 10/2017 | Koklu |
| 10,429,138 | B2 | 10/2019 | Gissen et al. |
| 2005/0087633 | A1 | 4/2005 | Gopalan |
| 2006/0157596 | A1 | 7/2006 | Tippetts |
| 2007/0063076 | A1 | 3/2007 | Gopalan |
| 2008/0149205 | A1 | 6/2008 | Gupta et al. |
| 2010/0123031 | A1 | 5/2010 | Weber |
| 2012/0175438 | A1 | 7/2012 | Ji et al. |
| 2013/0048274 | A1 | 2/2013 | Schultz et al. |
| 2014/0103134 | A1 | 4/2014 | Raghu |
| 2016/0030954 | A1 | 2/2016 | Gopalan et al. |
| 2016/0052621 | A1 * | 2/2016 | Ireland .......... F04D 29/681 137/13 |
| 2016/0243562 | A1 | 8/2016 | Koklu |
| 2016/0318602 | A1 * | 11/2016 | Whalen .......... B64C 21/04 |
| 2017/0216852 | A1 | 8/2017 | Gopalan et al. |
| 2017/0326560 | A1 | 11/2017 | Kanda |
| 2018/0281930 | A1 | 10/2018 | Koklu et al. |
| 2018/0370617 | A1 | 12/2018 | Raghu |
| 2019/0145441 | A1 | 5/2019 | Tomac et al. |
| 2020/0038884 | A1 * | 2/2020 | Wintering .......... B05B 1/08 |
| 2020/0306771 | A1 | 10/2020 | Tomac et al. |
| 2020/0376503 | A1 | 12/2020 | Wintering et al. |

FOREIGN PATENT DOCUMENTS

| | | |
|---|---|---|
| EP | 2554854 | 2/2013 |
| EP | 2708426 | 3/2014 |
| WO | 80/00927 | 5/1980 |
| WO | 2007/149436 | 12/2007 |
| WO | 2008/135967 | 11/2008 |
| WO | 2016/025858 A1 | 2/2016 |
| WO | 2016/161349 | 10/2016 |
| WO | 2017/194525 | 11/2017 |
| WO | 2018/197231 | 11/2018 |
| WO | 2019/108628 | 6/2019 |
| WO | 2021/096515 | 5/2021 |
| WO | 2021/096516 | 5/2021 |
| WO | 2021/145905 | 7/2021 |

OTHER PUBLICATIONS

Culley, Dennis. "Variable frequency diverter actuation for flow control." 3rd AIAA Flow Control Conference. Jun. 5-8, 2006. San Francisco, CA. 12 pages.

Deere, Karen et al. "A Computational Study of a Dual Throat Fluidic Thrust Vectoring Nozzle Concept." 41st AIAA/ASME/SAE/ASEE Joint Propulsion Conference & Exhibit. 2005. 16 pages.

Deere, Karen. "Summary of fluidic thrust vectoring research at NASA Langley Research Center." 21st AIAA applied aerodynamics conference. Jun. 23-26, 2003. Orlando, FL. 18 pages.

Gokoglu, S. A., Kuczmarski, M. A., Culley, D. E., and Raghu, S., 2011, "Numerical studies of an array of fluidic diverter actuators for flow control," AIAA-2011-3100, Proceedings of the 41st AIAA Fluid Dynamics Conference and Exhibit, Honolulu, HI.

Gregory, James W et al. "Variable-frequency fluidic oscillator driven by a piezoelectric bender." AIAA journal 47.11 (2009): 2717-2725.

European Patent Office. Extended European Search Report, issued in European Application No. 18883610.0 dated Jul. 16, 2021. 8 pages.

International Search Report and Written Opinion issued by the International Searching Authority (ISA/EP) in PCT Application No. PCT/US2019/061505 dated Aug. 3, 2020. 12 pages.

International Search Report and Written Opinion issued by the International Searching Authority (ISA/EP) in PCT Application No. PCT/US2019/061506 dated Aug. 24, 2020. 16 pages.

International Search Report and Written Opinion issued by the International Searching Authority (ISA/EP) in PCT Application No. PCT/US2020/017249 dated Feb. 12, 2021. 23 pages.

International Search Report and Written Opinion issued by the International Searching Authority (ISA/US) in PCT Application No. PCT/US2018/062812 dated Feb. 21, 2019. 10 pages.

Invitation to Pay Additional Fees and Communication Relating to the Results of the Partial International Search, issued by the International Searching Authority (ISA/EP) in PCT Application No. PCT/US2020/017249 dated Dec. 10, 2020. 16 pages.

Shigeta, M., Miura, T., Izawa, S., and Fukunishi, Y., 2009, "Active Control of Cavity Noise by Fluidic Oscillators," Theoretical and Applied Mechanics Japan, vol. 57, pp. 127-134.

Tesař, V., Zhong, S., and Rasheed, F., 2013, "New Fluidic-Oscillator Concept for Flow-Separation Control," AIAA Journal, vol. 51, No. 2, pp. 397-405.

Tomac, Mehmet N. "Effect of Geometry Modifications on the Vectoring Performance of a Controlled Jet." Journal of Applied Fluid Mechanics, 10 (1), 2017. 9 pages.

U.S. Patent & Trademark Office. Non-Final Office Action. U.S. Appl. No. 16/767,847, dated Nov. 17, 2022. 8 pages.

U.S. Patent & Trademark Office. Restriction Requirement. U.S. Appl. No. 16/767,847, dated Sep. 22, 2022. 6 pages.

European Patent Office. Communication under Rule 71(3). Issued in European Application No. 19817513.5 dated Mar. 27, 2023. 63 pages.

U.S. Patent & Trademark Office. Final Office Action. U.S. Appl. No. 16/767,847, dated May 12, 2023. 14 pages.

European Patent Office. Communication under Rule 71(3). Issued in European Application No. 18883610.0 dated May 16, 2023. 8 pages.

European Patent Office. Extended European Search Report, issued in European Application No. 20813670.5 dated May 22, 2023. 9 pages.

(56) References Cited

OTHER PUBLICATIONS

Japanese Patent Office. Office Action issued in JP Application No. 2022-528052 dated Aug. 16, 2023. 5 pages, including English translation.

* cited by examiner

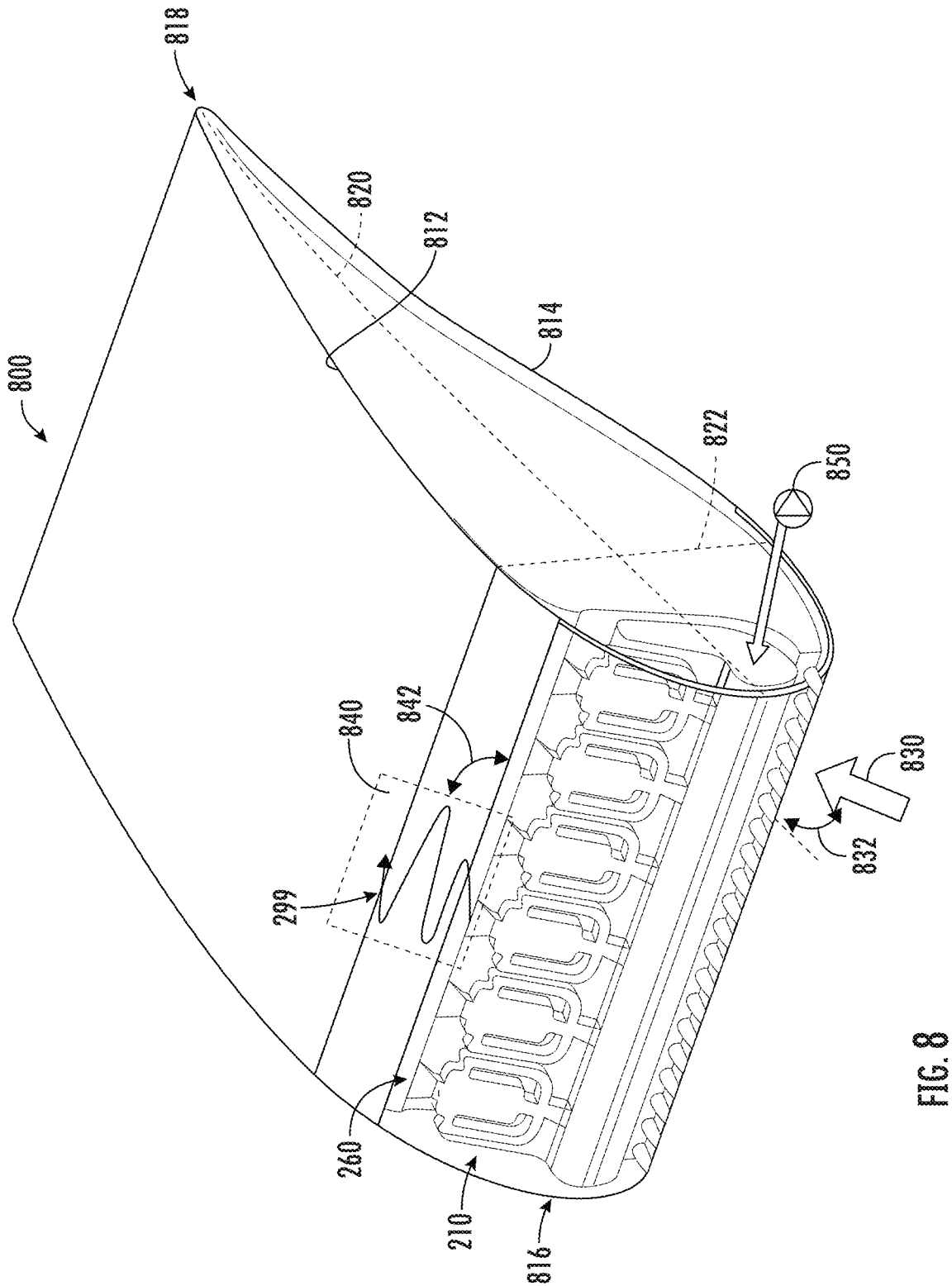

OUT-OF-PLANE CURVED FLUIDIC OSCILLATOR

CROSS REFERENCE TO RELATED APPLICATIONS

This is a national stage application filed under 35 U.S.C. §371 of PCT/US2020/034882, filed May 28, 2020, which claims the benefit of U.S. Provisional Patent Application No. 62/854,067, filed May 29, 2019, the content of which is incorporated herein by reference in its entirety.

STATEMENT REGARDING FEDERALLY SPONSORED RESEARCH OR DEVELOPMENT

This invention was made with government support under Grant No. FE0025320 awarded by the Department of Energy. The government has certain rights in the invention.

BACKGROUND

Fluidic oscillators are a type of non-moving part, fluidic device that produce a pulsed or sweeping jet with a wide range of frequencies. They operate solely by employing fluid dynamic principles when supplied by a pressurized fluid. These devices are generally preferred in many engineering applications, since they can provide a wide range of frequencies, have a simple maintenance-free design without moving parts, and generate an output jet that is unsteady and spreads more than a regular jet.

Straight fluid stream jets have been used with some success in airfoils to produce a fluid stream over a surface to prevent air separation, and thus stall, at high angles of attack. However, these streams produce only straight jets which do not provide an even coverage of the surface of the airfoil.

Attempts at using fluidic oscillators of the prior art to produce oscillating fluid streams over the surface of an airfoil have been unsuccessful. To be effective, the fluid stream produced by the fluidic oscillator must flow over the upper surface of the airfoil at the point of air separation in order to prevent separation. However, because of the length and shape of the fluidic oscillators of the prior art, the outlet nozzle of the fluidic oscillators of the prior art are not capable of being located close enough to the leading edge of the airfoil to be effective.

A similar issue arises in the application of a fluidic oscillator incorporated in a turbine blade to produce a coolant jet to prevent over heating of the blade. The exiting coolant jet is most effective when it flows over the suction peak, where the air flow and the heat is the highest. The fluidic oscillators of the art are not positionable such that the outlet nozzle produces a fluid stream at the suction peak.

Thus, a need exists for a fluidic oscillator geometry that allows the fluidic oscillator to be positioned within an object in more compact areas.

BRIEF DESCRIPTION OF DRAWINGS

Example features and implementations are disclosed in the accompanying drawings. However, the present disclosure is not limited to the precise arrangements and instrumentalities shown. Similar elements in different implementations are designated using the same reference numerals.

FIG. 8 is a perspective view of the out-of-plane feedback-type fluidic oscillator of FIG. 2 disposed at the location of the maximum temperature at the suction peak of a turbine blade.

DETAILED DESCRIPTION

Figure 1A:
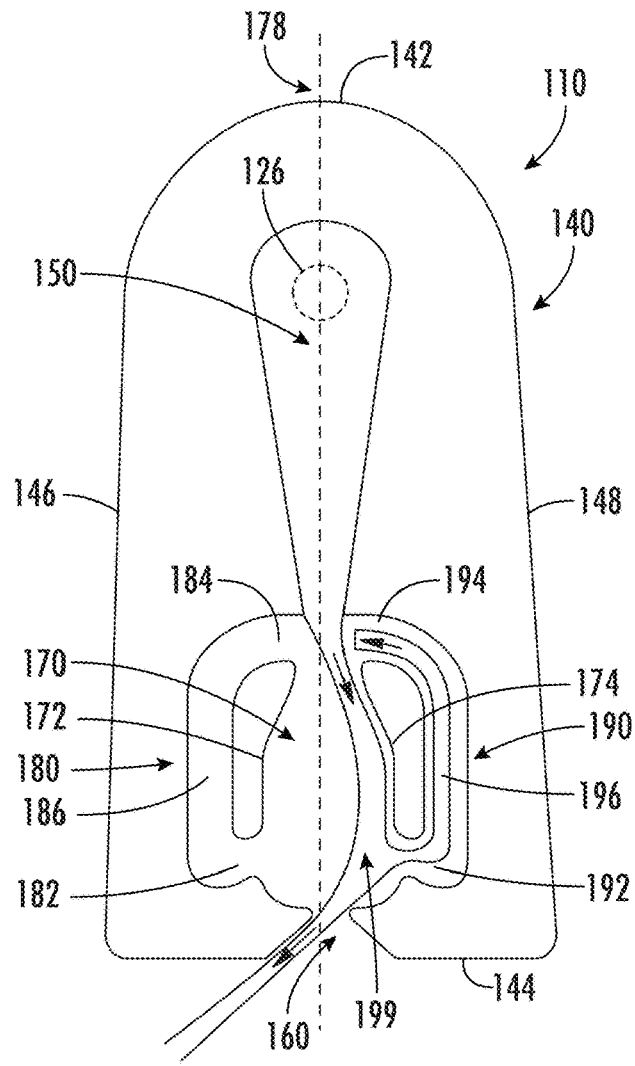
FIG. 1A is a top view of a feedback-type fluidic oscillator of the prior art.

The devices and systems disclosed herein provide for an out-of-plane feedback-type fluidic oscillator that is capable of producing an oscillating exiting fluid stream. At a high enough curvature of a fluidic oscillator, the fluidic oscillator stops producing an oscillating fluid stream. By designing a fluidic oscillator within the parameters disclosed herein, the fluidic oscillator can be curved to be incorporated into more compact spaces while still outputting an oscillating fluid stream.

Various implementations include, an out-of-plane feedback-type fluidic oscillator. The fluidic oscillator includes a first portion, a second portion, a middle portion coupled between the first portion and the middle portion, and an axis of rotation. The middle portion includes a first side, a second side opposite and spaced apart from the first side, and a middle plane, an interaction chamber, a fluid supply inlet, an outlet nozzle, a first feedback a channel, and a second feedback channel. The first side is coupled to the first portion, and the second side is coupled to the second portion. The first side, the second side, and the middle plane extend circumferentially around the axis of rotation. The middle plane is disposed equally distanced from the first side and the second side. The interaction chamber has a first attachment wall and a second attachment wall opposite and spaced apart from the first attachment wall. The fluid supply inlet is for introducing a fluid stream into the interaction chamber. The outlet nozzle is downstream of the fluid supply inlet. The fluid stream exits the interaction chamber through the outlet nozzle. The first feedback channel is coupled to the first attachment wall, and the second feedback channel is coupled to the second attachment wall. The first feedback channel and second feedback channel are in fluid communication with the interaction chamber. Each of the first feedback channel and second feedback channel has a first end, a second end opposite and spaced apart from the first end, and an intermediate portion disposed between the first end and second end. The first end is adjacent the outlet nozzle, and the second end is adjacent the fluid supply inlet. The first attachment wall and second attachment wall of the interaction chamber are shaped to allow fluid from the fluid stream to flow into the first ends of the first feedback channel and second feedback channel, respectively, causing the fluid stream to oscillate between the first attachment wall and second attachment wall of the interaction chamber such that the fluid stream oscillates as the fluid stream exits the outlet nozzle.

Various other implementations include an airfoil. The airfoil includes a body and an out-of-plane feedback-type fluidic oscillator. The body includes an upper surface, a lower surface opposite and spaced apart from the upper surface, and a leading edge. The fluidic oscillator includes a first portion, a second portion, a middle portion coupled between the first portion and the middle portion, and an axis of rotation. The middle portion includes a first side, a second side opposite and spaced apart from the first side, and a middle plane, an interaction chamber, a fluid supply inlet, an outlet nozzle, a first feedback a channel, and a second feedback channel. The first side is coupled to the first portion, and the second side is coupled to the second portion. The first side, the second side, and the middle plane extend circumferentially around the axis of rotation. The middle plane is disposed equally distanced from the first side and the second side. The interaction chamber has a first attachment wall and a second attachment wall opposite and spaced apart from the first attachment wall. The fluid supply inlet is for introducing a fluid stream into the interaction chamber. The outlet nozzle is downstream of the fluid supply inlet. The fluid stream exits the interaction chamber through the outlet nozzle. The first feedback channel is coupled to the first attachment wall, and the second feedback channel is coupled to the second attachment wall. The first feedback channel and second feedback channel are in fluid communication with the interaction chamber. Each of the first feedback channel and second feedback channel has a first end, a second end opposite and spaced apart from the first end, and an intermediate portion disposed between the first end and second end. The first end is adjacent the outlet nozzle, and the second end is adjacent the fluid supply inlet. The first attachment wall and second attachment wall of the interaction chamber are shaped to allow fluid from the fluid stream to flow into the first ends of the first feedback channel and second feedback channel, respectively, causing the fluid stream to oscillate between the first attachment wall and second attachment wall of the interaction chamber such that the fluid stream oscillates as the fluid stream exits the outlet nozzle. The outlet nozzle is defined by a portion of the upper surface, and the fluidic oscillator is positioned such that the fluid stream exiting the outlet nozzle flows over a portion of the upper surface of the body.

Various other implementations include a turbine. The turbine includes at least one turbine blade and an out-of-plane feedback-type fluidic oscillator. The at least one turbine blade includes an upper surface, a lower surface spaced apart from the upper surface, and a leading edge. The fluidic oscillator includes a first portion, a second portion, a middle portion coupled between the first portion and the middle portion, and an axis of rotation. The middle portion includes a first side, a second side opposite and spaced apart from the first side, and a middle plane, an interaction chamber, a fluid supply inlet, an outlet nozzle, a first feedback a channel, and a second feedback channel. The first side is coupled to the first portion, and the second side is coupled to the second portion. The first side, the second side, and the middle plane extend circumferentially around the axis of rotation. The middle plane is disposed equally distanced from the first side and the second side. The interaction chamber has a first attachment wall and a second attachment wall opposite and spaced apart from the first attachment wall. The fluid supply inlet is for introducing a fluid stream into the interaction chamber. The outlet nozzle is downstream of the fluid supply inlet. The fluid stream exits the interaction chamber through the outlet nozzle. The first feedback channel is coupled to the first attachment wall, and the second feedback channel is coupled to the second attachment wall. The first feedback channel and second feedback channel are in fluid communication with the interaction chamber. Each of the first feedback channel and second feedback channel has a first end, a second end opposite and spaced apart from the first end, and an intermediate portion disposed between the first end and second end. The first end is adjacent the outlet nozzle, and the second end is adjacent the fluid supply inlet. The first attachment wall and second attachment wall of the interaction chamber are shaped to allow fluid from the fluid stream to flow into the first ends of the first feedback channel and second feedback channel, respectively, causing the fluid stream to oscillate between the first attachment wall and second attachment wall of the interaction chamber such that the fluid stream oscillates as the fluid stream exits the outlet nozzle. The outlet nozzle is defined by the upper surface, and the fluidic oscillator is positioned such that the fluid stream exiting the outlet nozzle flows over a portion of the upper surface of the at least one turbine blade.

Figure 1B:
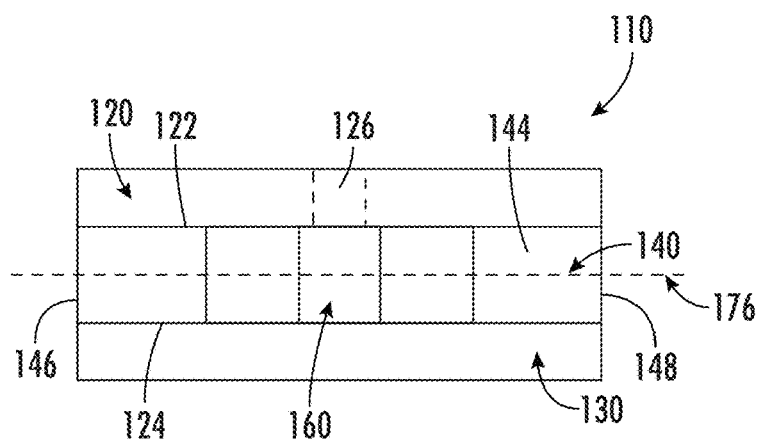
FIG. 1B is an end view of the feedback-type fluidic oscillator of FIG. 1A.

FIG. 1A shows a top view of a feedback-type fluidic oscillator 110 known in the art, and FIG. 1B shows an end view of the feedback-type fluidic oscillator 110 as viewed from the second end 144 of the middle portion 140. The fluidic oscillator 110 includes a first portion 120, a second portion 130, and a middle portion 140 disposed between the first portion 120 and the second portion 130. The middle portion 140 has a first end 142 and a second end 144 opposite and spaced apart from the first end 142, and a first edge 146 and a second edge 148 opposite and spaced apart from the first edge 146. The middle portion further has a first side 122, a second side 124 opposite and spaced apart from the first side 122, and a middle plane 176 disposed equally distanced from the first side 122 and the second side 124. The middle portion 140 is structured such that, when the middle portion 140 is disposed between the first portion 120 and the second portion 130, openings are defined by the walls of the middle portion 140. The openings in the middle portion 140 of the fluidic oscillator 110 include an interaction chamber 170, a fluid supply inlet 150, an outlet nozzle 160, a first feedback channel 180, and a second feedback channel 190. The middle portion 140 of the fluidic oscillator 110 also includes a central axis 178 extending between the fluid supply inlet 150 and the outlet nozzle 160.

The first portion 120 of the fluidic oscillator 110 defines an inlet port 126 extending through the first portion 120. The fluid supply inlet 150 of the middle portion 140 is located adjacent the first end 142 of the middle portion 140, and the inlet port 126 is aligned with the fluid supply inlet 150 such that the inlet port 126 and the fluid supply inlet 150 are in fluid communication with each other.

The outlet nozzle 160 is located adjacent the second end 144 of the middle portion 140, downstream of the fluid supply inlet 150, as discussed below. The outlet nozzle 160 extends from the second end 144 of the middle portion 140 toward the first end 142 of the middle portion 140.

The interaction chamber 170 is located between, and is in fluid communication with, the fluid supply inlet 150 and the outlet nozzle 160. The interaction chamber 170 has a first attachment wall 172 and a second attachment wall 174 that is opposite and spaced apart from the first attachment wall 172. The interaction chamber 170 also has middle plane 176 extending between the first attachment wall 172 and the second attachment wall 174 and parallel to the middle plane 176. The first attachment wall 172 and second attachment wall 174 mirror each other across a plane intersecting the central axis 178 and perpendicular to the middle plane 176. Each attachment wall 172, 174 has a curvature such that the first attachment wall 172 and second attachment wall 174 are closer to each other adjacent the fluid supply inlet 150 than adjacent the outlet nozzle 160.

The first feedback channel 180 and the second feedback channel 190 each have a first end 182, 192, a second end 184, 194 opposite and spaced apart from the first end 182, 192, and an intermediate portion 186, 196 disposed between the first end 182, 192 and second end 184, 194. The first feedback channel 180 is coupled to the first attachment wall 172 and the second feedback channel 190 is coupled to the second attachment wall 174 such that both the first feedback channel 180 and the second feedback channel 190 are in fluid communication with the interaction chamber 170. The first end 182, 192 of both feedback channels 180, 190 is adjacent the outlet nozzle 160 such that the first ends 182, 192 of the feedback channels 180, 190 are closer than the second ends 184, 194 of the feedback channels 180, 190 to the outlet nozzle 160. The second end 184, 194 of both feedback channels 180, 190 is adjacent the fluid supply inlet 150 such that the second ends 184, 194 of the feedback channels 180, 190 are closer than the first ends 182, 192 of the feedback channels 180, 190 to the fluid supply inlet 150.

A fluid stream 199 enters the fluidic oscillator 110 through the inlet port 126 and flows through the fluid supply inlet 150, through the interaction chamber 170, and exits the fluidic oscillator 110 through the outlet nozzle 160. The first attachment wall 172 and second attachment wall 174 of the interaction chamber 170 are a predetermined distance from each other such that, as the fluid stream 199 flows through the interaction chamber 170, a pressure difference across the fluid stream 199 causes the fluid stream 199 to deflect toward, and eventually attach to, either the first attachment wall 172 or the second attachment wall 174 due to the Coanda effect. The first attachment wall 172 and second attachment wall 174 of the interaction chamber 170 are shaped to allow fluid from the fluid stream 199 to flow into the first ends 182, 192 of the first feedback channel 180 and second feedback channel 190, respectively, when the fluid stream 199 is attached to that attachment wall 172, 174. The fluid stream 199 can include any fluid, for example, any liquid or gas.

When the fluid stream 199 is attached to the first attachment wall 172, fluid from the fluid stream 199 enters the first end 182 of the first feedback channel 180, flows through the intermediate portion 186 of the first feedback channel 180 and out of the second end 184 of the first feedback channel 180. The fluid exiting the second end 184 of the first feedback channel 180 contacts the fluid stream 199 adjacent the fluid supply inlet 150, causing the fluid stream 199 to detach from the first attachment wall 172 and attach to the second attachment wall 174. Fluid from the fluid stream 199 then enters the first end 192 of the second feedback channel 190, flows through the intermediate portion 196 of the second feedback channel 190 and out of the second end 194 of the second feedback channel 190. The fluid exiting the second end 194 of the second feedback channel 190 contacts the fluid stream 199 adjacent the fluid supply inlet 150, causing the fluid stream 199 to detach from the second attachment wall 174 and attach back to the first attachment wall 172. The fluid stream 199 continues to oscillate between attachment to the first attachment wall 172 and second attachment wall 174 of the interaction chamber 170.

Because of the shape of the outlet nozzle 160 and the curvature of the first attachment wall 172 and second attachment wall 174, the oscillation of the fluid stream 199 between the first attachment wall 172 and the second attachment wall 174 causes the fluid stream 199 to oscillate in a plane parallel to the middle plane 176 as the fluid stream 199 exits the fluidic oscillator 110 through the outlet nozzle 160.

Figure 2:
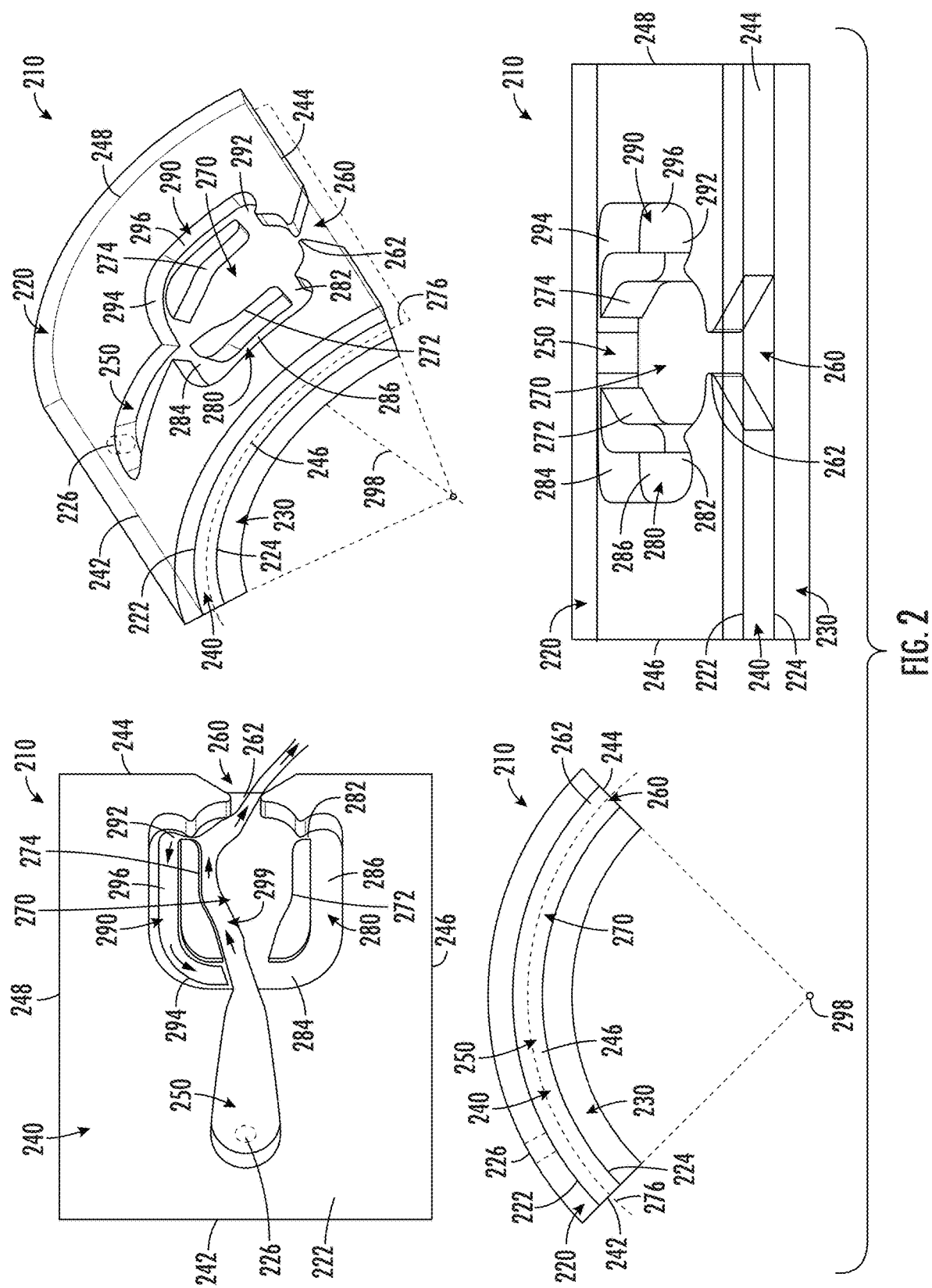
FIG. 2 is a top view, a side view, an end view, and a perspective view of an out-of-plane feedback-type fluidic oscillator, according to one implementation.

FIG. 2 shows one example of an out-of-plane feedback-type fluidic oscillator 210 according to an implementation of the current application. The fluidic oscillator 210 of FIG. 2 is similar to the fluidic oscillator 110 shown in FIG. 1, but the fluidic oscillator 210 of FIG. 2 includes an axis of rotation 298, and the first side 222 of the middle portion 240, the second side 224 of the middle portion 240, and the middle plane 276 extend circumferentially around the axis of rotation 298. The term "plane" as used herein refers to any two-dimensional surface, whether the surface is straight (flat) or curved, as the middle plane is shown in FIG. 2.

The fluidic oscillator 210 includes a first portion 220, a second portion 230, and a middle portion 240 disposed between the first portion 220 and the second portion 230. The middle portion 240 has a first end 242 and a second end 244 opposite and spaced apart from the first end 242, and a first edge 246 and a second edge 248 opposite and spaced apart from the first edge 246. The middle portion further has a first side 222, a second side 224 opposite and spaced apart from the first side 222, and a middle plane 276 disposed equally distanced from the first side 222 and the second side 224. The middle portion 240 is structured such that, when the middle portion 240 is disposed between the first portion 220 and the second portion 230, openings are defined by the walls of the middle portion 240. The openings in the middle portion 240 of the fluidic oscillator 210 include an interaction chamber 270, a fluid supply inlet 250, an outlet nozzle 260, a first feedback channel 280, and a second feedback channel 290. The middle portion 240 of the fluidic oscillator 210 also includes a central axis 278 extending between the fluid supply inlet 250 and the outlet nozzle 260.

Figure 6:
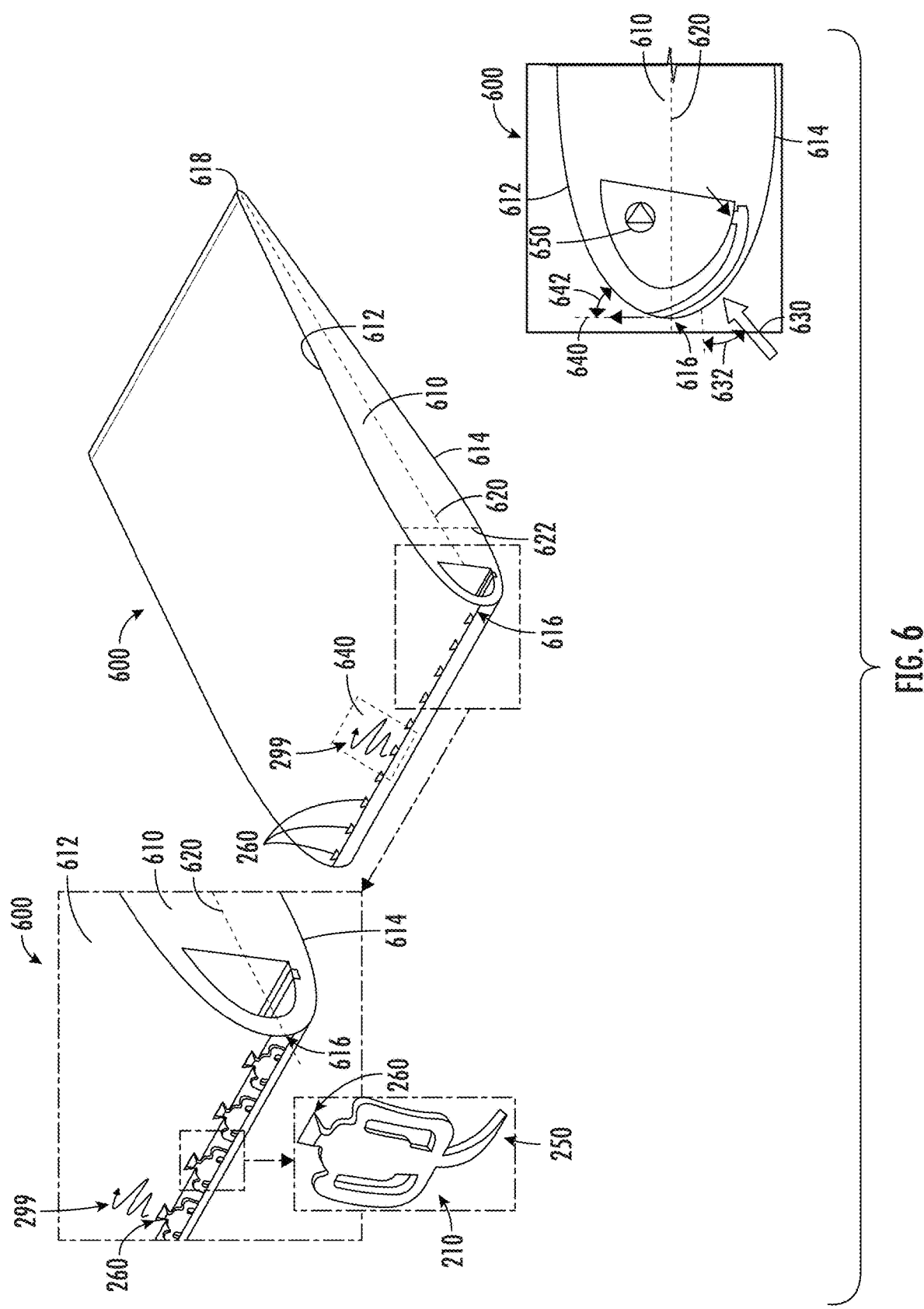
FIG. 6 is a perspective view and an end view of the out-of-plane feedback-type fluidic oscillator of FIG. 2 disposed at the leading edge of an airfoil.

The axis of rotation 298 extends parallel to both ends 242, 244 of the middle portion 240 and is disposed closer to the second portion 230 than the first portion 220. However, in some implementations, the axis of rotation is disposed closer to the first portion than the second portion, as seen in FIGS. 6 and 8. The first side 222 of the middle portion 240, the second side 224 of the middle portion 240, and the middle plane 276 extend circumferentially around the axis of rotation 298 such that the fluidic oscillator 210 is curved from the first end 242 to the second end 244. Because of the curvature of the fluidic oscillator, the second side 224 of the middle portion 240 is shorter when measured from the first end 242 to the second end 244, and the first side 222 of the middle portion 240 is longer when measured from the first end 242 to the second end 244, in the out-of-plane feedback-type fluidic oscillator 210 than in the second side 124 and first side 122 of the feedback-type fluidic oscillator 110 known in the art.

The first portion 220 of the fluidic oscillator 210 defines an inlet port 226 extending through the first portion 220. The fluid supply inlet 250 of the middle portion 240 is located adjacent the first end 242 of the middle portion 240, and the inlet port 226 is aligned with the fluid supply inlet 250 such that the inlet port 226 and the fluid supply inlet 250 are in fluid communication with each other.

The outlet nozzle 260 is located adjacent the second end 244 of the middle portion 240, downstream of the fluid supply inlet 250, as discussed below. The outlet nozzle 260 extends from the second end 244 of the middle portion 240 toward the first end 242 of the middle portion 240.

The interaction chamber 270 is located between, and is in fluid communication with, the fluid supply inlet 250 and the outlet nozzle 260. The interaction chamber 270 has a first attachment wall 272 and a second attachment wall 274 that is opposite and spaced apart from the first attachment wall 272. The interaction chamber 270 also has middle plane 276 extending between the first attachment wall 272 and the second attachment wall 274 and parallel to the middle plane 276. The first attachment wall 272 and second attachment wall 274 mirror each other across a plane intersecting the central axis 278 and perpendicular to the middle plane 276. Each attachment wall 272, 274 has a curvature such that the first attachment wall 272 and second attachment wall 274 are closer to each other adjacent the fluid supply inlet 250 than adjacent the outlet nozzle 260.

The first feedback channel 280 and the second feedback channel 290 each have a first end 282, 292, a second end 284, 294 opposite and spaced apart from the first end 282, 292, and an intermediate portion 286, 296 disposed between the first end 282, 292 and second end 284, 294. The first feedback channel 280 is coupled to the first attachment wall 272 and the second feedback channel 290 is coupled to the second attachment wall 274 such that both the first feedback channel 280 and the second feedback channel 290 are in fluid communication with the interaction chamber 270. The first end 282, 292 of both feedback channels 280, 290 is adjacent the outlet nozzle 260 such that the first ends 282, 292 of the feedback channels 280, 290 are closer than the second ends 284, 294 of the feedback channels 280, 290 to the outlet nozzle 260. The second end 284, 294 of both feedback channels 280, 290 is adjacent the fluid supply inlet 250 such that the second ends 284, 294 of the feedback channels 280, 290 are closer than the first ends 282, 292 of the feedback channels 280, 290 to the fluid supply inlet 250.

A fluid stream 299 enters the fluidic oscillator 210 through the inlet port 226 and flows through the fluid supply inlet 250, through the interaction chamber 270, and exits the fluidic oscillator 210 through the outlet nozzle 260. The first attachment wall 272 and second attachment wall 274 of the interaction chamber 270 are a predetermined distance from each other such that, as the fluid stream 299 flows through the interaction chamber 270, a pressure difference across the fluid stream 299 causes the fluid stream 299 to deflect toward, and eventually attach to, either the first attachment wall 272 or the second attachment wall 274 due to the Coanda effect. The first attachment wall 272 and second attachment wall 274 of the interaction chamber 270 are shaped to allow fluid from the fluid stream 299 to flow into the first ends 282, 292 of the first feedback channel 280 and second feedback channel 290, respectively, when the fluid stream 299 is attached to that attachment wall 272, 274. The fluid stream 299 can include any fluid, for example, any liquid or gas.

When the fluid stream 299 is attached to the first attachment wall 272, fluid from the fluid stream 299 enters the first end 282 of the first feedback channel 280, flows through the intermediate portion 286 of the first feedback channel 280 and out of the second end 284 of the first feedback channel 280. The fluid exiting the second end 284 of the first feedback channel 280 contacts the fluid stream 299 adjacent the fluid supply inlet 250, causing the fluid stream 299 to detach from the first attachment wall 272 and attach to the second attachment wall 274. Fluid from the fluid stream 299 then enters the first end 292 of the second feedback channel 290, flows through the intermediate portion 296 of the second feedback channel 290 and out of the second end 294 of the second feedback channel 290. The fluid exiting the second end 294 of the second feedback channel 290 contacts the fluid stream 299 adjacent the fluid supply inlet 250, causing the fluid stream 299 to detach from the second attachment wall 274 and attach back to the first attachment wall 272. The fluid stream 299 continues to oscillate between attachment to the first attachment wall 272 and second attachment wall 274 of the interaction chamber 270.

Because of the shape of the outlet nozzle 260 and the curvature of the first attachment wall 272 and second attachment wall 274, the oscillation of the fluid stream 299 between the first attachment wall 272 and the second attachment wall 274 causes the fluid stream 299 to oscillate in a plane parallel to the middle plane 276 as the fluid stream 299 exits the fluidic oscillator 210 through the outlet nozzle 260.

Figure 3:
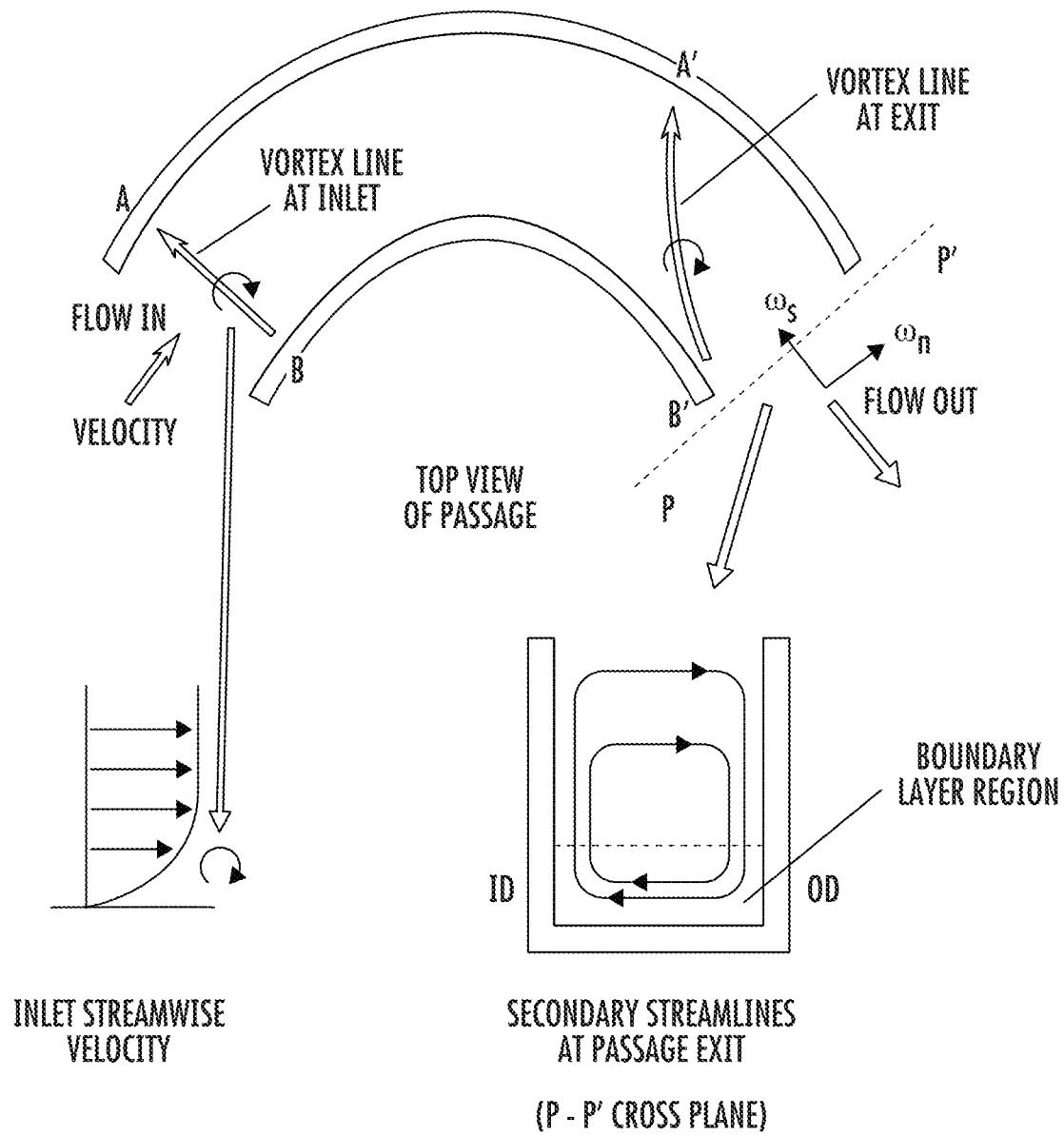
FIG. 3 is a diagram showing secondary flow in a curved passage.

FIG. 3 is a diagram of secondary flow within a curved passage such as the out-of-plane feedback-type fluidic oscillator shown in FIG. 2. At the inlet, a boundary layer is on the floor of the passage and the free-stream velocity can be considered approximately uniform in a direction across the passage. The vortex lines run across the channel normal to the inlet velocity, as indicated by the arrow AB and are located near the channel floor where the flow has non-uniform velocity due to fluid viscosity. As the flow proceeds round the bend, the fluid near the inner wall will have a higher velocity than that near the outer wall. Also, the fluid particles on the outside wall also have farther to travel. The net result is that a line of particles AB, initially normal to the mean flow, ends up oriented as A'B', at the passage exit. The result is a component of streamwise vorticity at the exit giving a secondary flow as indicated in the channel cross-section (PP') shown in FIG. 3. At a high enough secondary flow, the secondary flow disrupts the primary fluid stream through the interaction chamber and causes the primary fluid stream to no longer attach to the first attachment wall 272 and second attachment wall 274, resulting in no oscillation within the interaction chamber.

It has been discovered that the factors that affect the secondary flow are the radius of curvature R of the fluidic oscillator 210 around the axis of rotation 298, the bending angle θ of the fluidic oscillator 210 around the axis of rotation 298, and the hydraulic diameter D of the throat 262 of the outlet nozzle 260. The throat 262 of the outlet nozzle 260 is defined as the portion of the outlet nozzle 260 with a smallest hydraulic diameter D. The hydraulic diameter D of the throat 262 of the outlet nozzle in the fluidic oscillator shown in FIG. 2 is square, but in some implementations, the hydraulic diameter is rectangle, circular, or any other shape. For a square or rectangular throat of the outlet nozzle, the hydraulic diameter $D=4dw/2(d+w)$, wherein d is the depth of the throat and w is the width of the throat.

A large hydraulic diameter D relative to the radius of curvature R can create too large of a difference in arc lengths between the outer diameter of the middle portion 240 and the inner diameter of the middle portion 240, which means that the difference in the speeds of the fluid nearest these walls is greater. Thus, a smaller ratio of R:D creates a larger secondary flow. A larger bending angle θ creates a larger difference in arc lengths as well, leading to a higher secondary flow for a larger bending angle θ.

In some implementations, the bending angle θ is greater than 15° and less than 90°. In some implementations, the throat of the outlet nozzle has a depth measured from the first portion to the second portion and a smallest width measured perpendicular to the depth, and the depth is less than or equal to the width but greater than or equal to half of the width. In some implementations, the angle of the outlet nozzle is configured such that the fluid stream exiting the outlet nozzle oscillates at an oscillation angle of 70 degrees or less.

Figure 4:
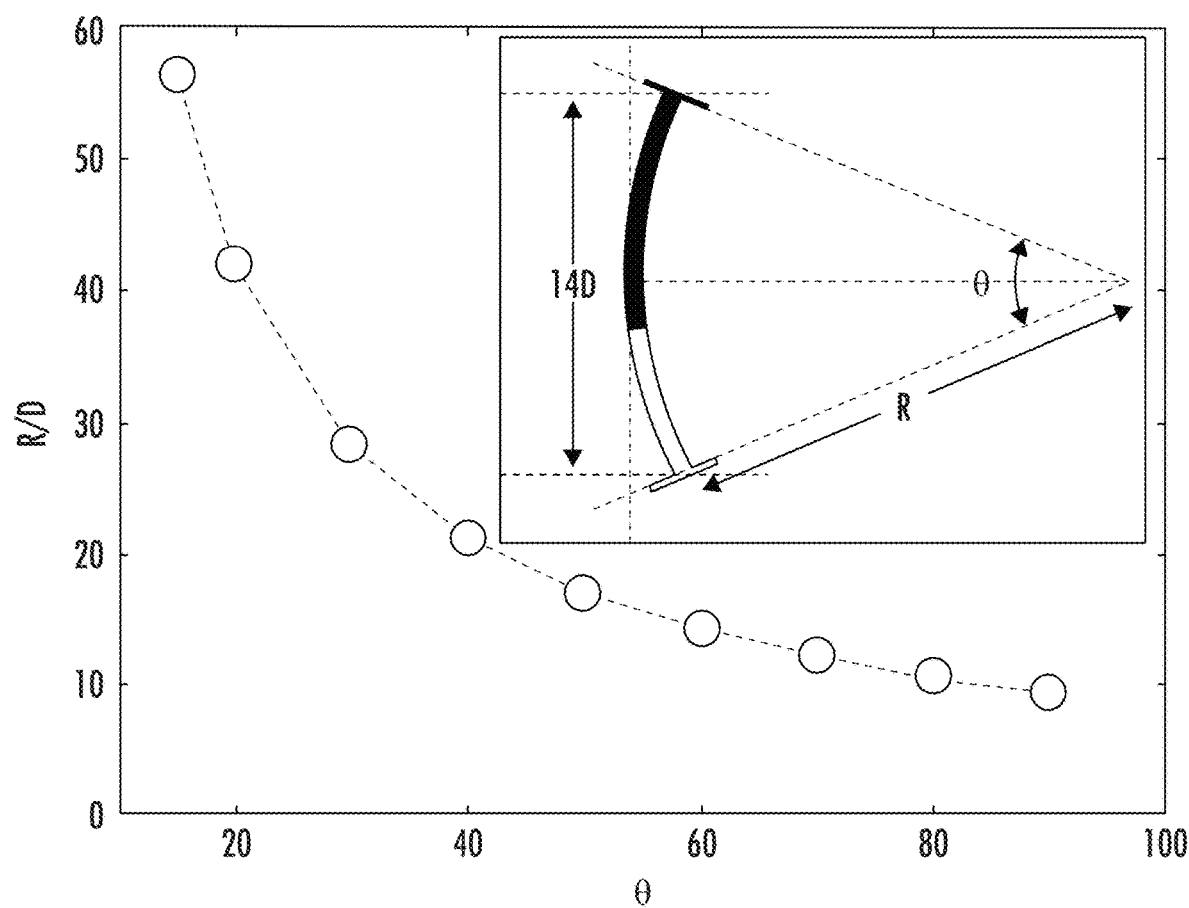
FIG. 4 is a graph showing a range of curvature dimensions of the out-of-plane feedback-type fluidic oscillator of FIG. 2 that produce an oscillating fluid stream.

FIG. 4 shows a graph of out-of-plane feedback-type fluidic oscillator curvature dimensions that still produce an oscillating fluid stream exiting the outlet nozzle. The graph plots the ratio of radius of curvature R to the hydraulic diameter D on the Y-axis and the bending angle θ on the X-axis. It has been discovered that any out-of-plane feedback-type fluidic oscillator with dimensions plotted above the curve shown in FIG. 3 produce an oscillating fluid stream exiting the outlet nozzle. The formula for the curve shown in FIG. 3 is $R/D=845.49(\theta)^1$, wherein θ is measured in degrees. Thus, any fluidic oscillator with dimensions of $R/D \leq 845.49(\theta)^1$ will produce an oscillating fluid stream exiting the outlet nozzle. This equation has been experimentally determined to provide the maximum bending angle θ for a stable oscillation for an oscillator with a throat aspect ratio (width to height ratio of the throat) of 1 and a specified R/D. However, the maximum bending angle θ for an oscillator having a throat aspect ratio near 1 can be found using the same formula as well.

Various advantages are realized by curving the first side 222 of the middle section 240, the second side 224 of the middle section 240, and the middle plane 276 of a fluidic oscillator 210. In some implementations in which a fluidic oscillator is embedded in an object, it is desired that the fluid stream exiting the outlet nozzle is tangential, or close to tangential, to an outer surface of the object. Furthermore, in some of these implementations, the location of the outlet nozzle on the outer surface of the object is restricted by the length of the fluidic oscillator as measured from the first end to the second end of the middle portion. Specifically, the closeness of the outlet nozzle of an in-plane fluidic oscillator of the prior art to an edge of an object is determined by the length of the oscillator when the exiting fluid stream is directed away from the edge. The oscillation of the fluid stream exiting the outlet nozzle of the fluidic oscillator creates a large and even coverage area.

Figure 5:
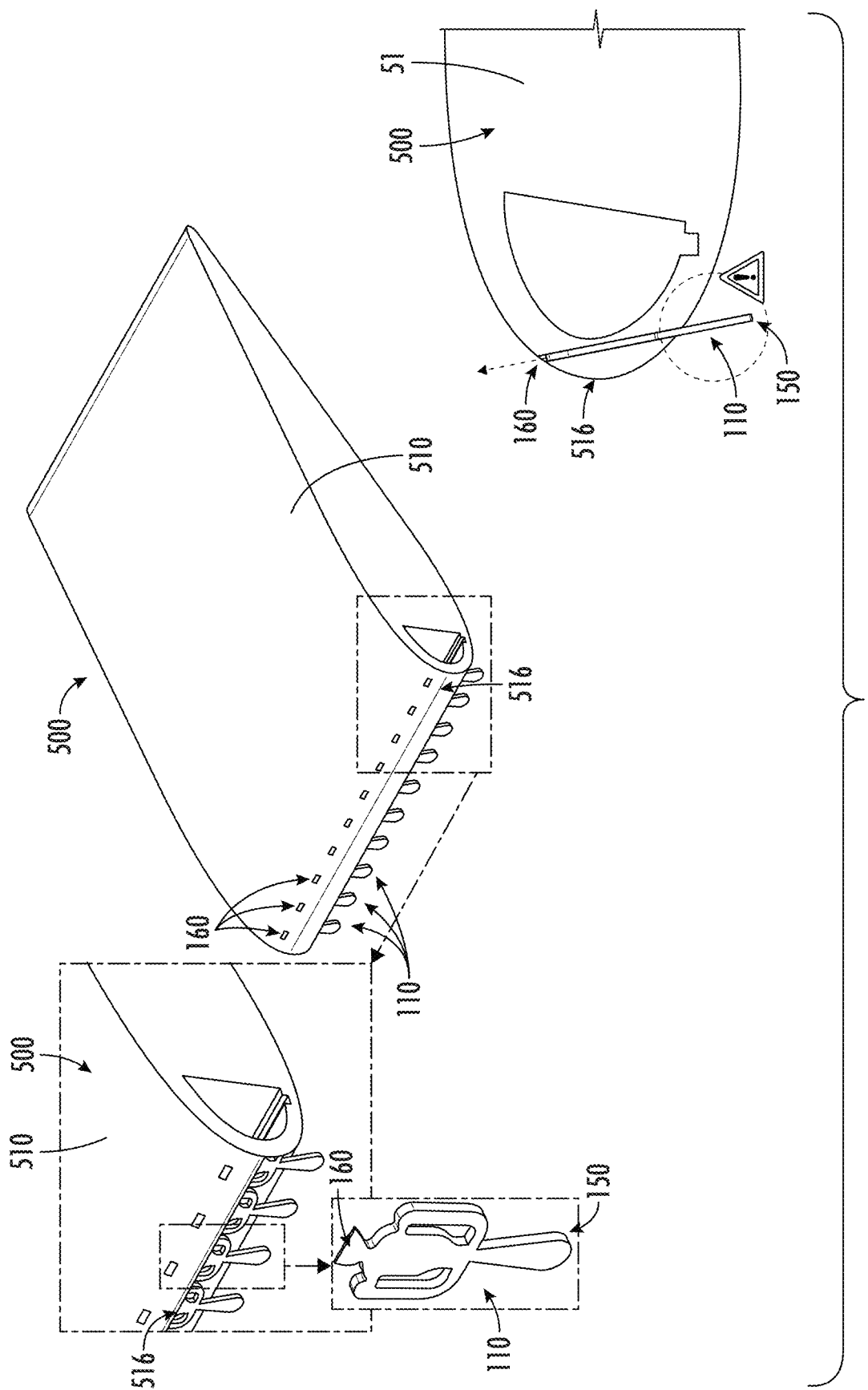
FIG. 5 is a perspective view and an end view of a feedback-type fluidic oscillator of the prior art disposed at the leading edge of an airfoil.

FIG. 5 shows an example of an airfoil 500 including in-plane fluidic oscillators 110 of the prior art extending out of the leading edge 516 of the body 510 of the airfoil 500 because the fluidic oscillator 110 is too long for the desired outlet nozzle 160 location. By curving the fluidic oscillator, the fluidic oscillator can be located in various locations within an object that are not possible with the in-plane fluidic oscillators of the prior art. Specifically, the out-of-plane feedback-type fluidic oscillators 210 disclosed herein allow for the outlet nozzle 260 of the fluidic oscillator 210 to be located closer to the edge of some objects.

FIG. 6 shows an airfoil 600 including a body 610 and the out-of-plane feedback-type fluidic oscillator 210 shown in FIG. 2. In this implementation, an air compressor 650 supplies the fluid supply inlet 250 of the fluidic oscillators 210 with compressed air. In some implementations, the air compressor 650 is an air compressor used another process, such as the air conditioning in an airplane.

The body 610 of the airfoil 600 includes an upper surface 612 and a lower surface 614 opposite and spaced apart from the upper surface 612. The body 610 also has a leading edge 616 where the upper surface 612 and the lower surface 614 connect. The leading edge 616 of the body 610 of the airfoil 600 is ideally where oncoming air 630 first interacts with the airfoil 600. The body 610 further includes a trailing edge 618 opposite the leading edge 616 where the upper surface 612 and the lower surface 614 connect. A chord line 620 extends between the leading edge 616 and the trailing edge 618 when the airfoil 600 is viewed from a cross-sectional view, and a maximum thickness plane 622 of the airfoil 600 extends perpendicular to the chord line 620.

The fluidic oscillator 210 is positioned in the airfoil 600 such that the outlet nozzle 260 of the fluidic oscillator 210 is defined by the upper surface 612 of the body 610 of the airfoil 600. The outlet nozzle 260 is angled such that the fluid stream 299 exiting the outlet nozzle 260 flows over the upper surface 612 of the body 610 of the airfoil 600 and flows in a direction from the leading edge 616 to the trailing edge 618 of the body 610. Thus, the fluid stream 299 exiting the outlet nozzle 260 of the fluidic oscillator 210 flows in the same direction as oncoming air 630. As the fluid stream 299 exits the outlet nozzle 260, the fluid stream 299 oscillates in an oscillation plane 640 tangent to the middle plane 276. The oscillation plane angle 642 is measured as the angle between the oscillation plane 640 and the portion of the upper surface 612 of the body 610 of the airfoil 600 from which the fluid stream 299 exits the outlet nozzle 260. It is preferred that the oscillation plane angle 642 is as small as possible such that the fluid stream 299 exiting the outlet nozzle 260 is directed as closely to tangential to the upper surface 612 of the body 610 as possible. In some implementations, the oscillation plane angle 642 is between 10 degrees and 0 degrees.

Figure 7:
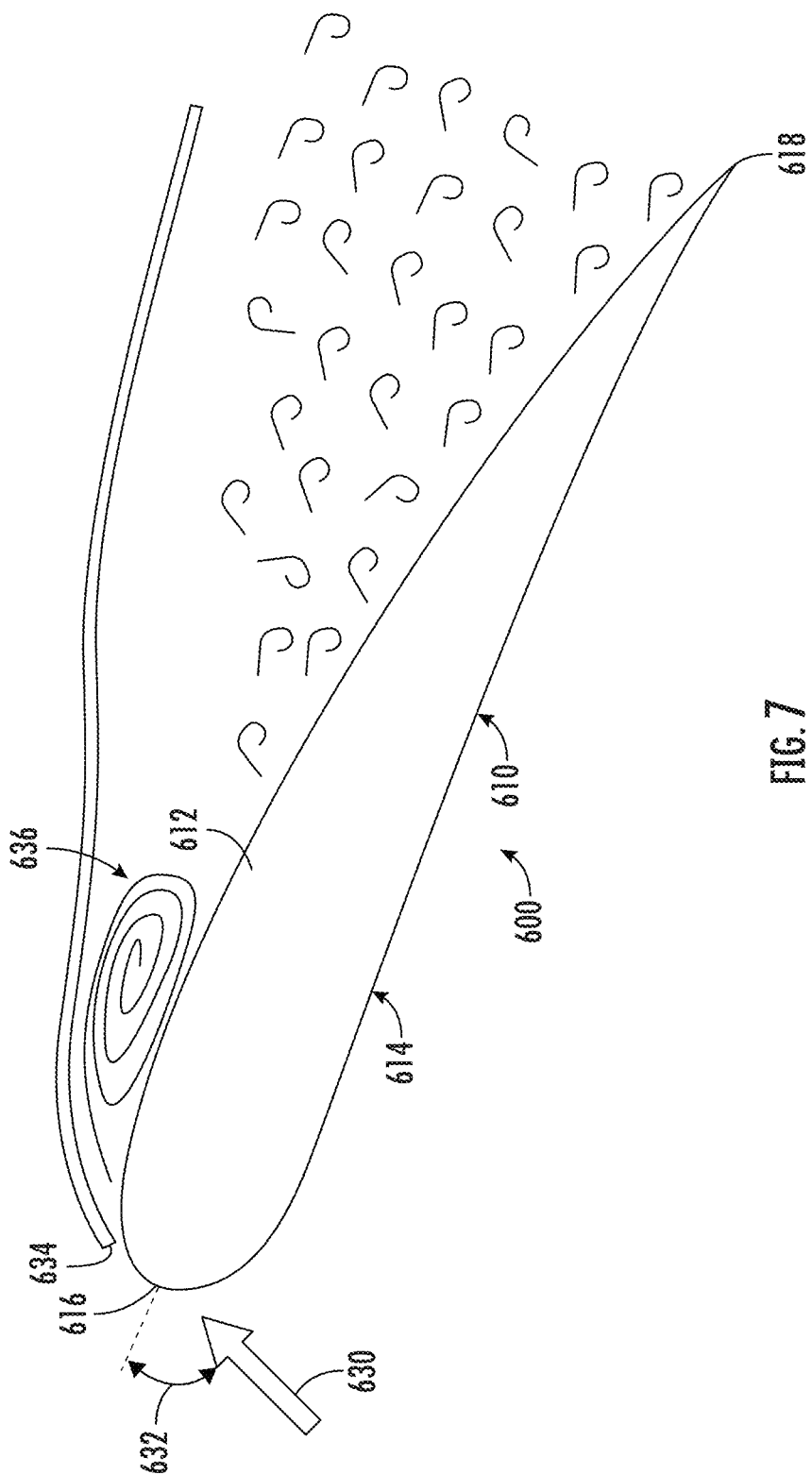
FIG. 7 is a side view of an air foil and a separation bubble at the leading edge.

The angle of attack 632 of the oncoming air 630 interacting with the airfoil 600 is defined as the direction of the oncoming air 630 relative to the leading edge 616 of the body 610 of the airfoil 600. As the oncoming air 630 passes over the upper surface 612, and under the lower surface 614, of the airfoil 600, the air tends to attach to the surfaces 612, 614 of the airfoil 600. The shapes of the upper surface 612 and the lower surface 614 cause the air flowing along these surfaces to flow at different velocities, and the relative velocities of the air moving along the upper surface 612 and lower surface 614 creates lift. At a high enough angle of attack 632, the air begins to separate from the upper surface 612, as shown in FIG. 7, creating a turbulent separation layer 636 and causing the airfoil 600 to stall. However, if the point of air separation 634 is near the exiting oscillatory fluid streams 299 from the fluidic oscillators 210, the exiting fluid stream 299 flowing along the upper surface 612 of the airfoil 600 and the passing air will be attracted to each other, and the air will remain attached to the upper surface 612 of the airfoil 600. Thus, by positioning the outlet nozzle 260 of the fluidic oscillator 210 near the point of air separation 634 on an airfoil 600, the airfoil 600 can handle higher angles of attack 632 without stalling. In some implementations, the outlet nozzle 260 is defined by a portion of the upper surface 612 of the airfoil 600 between the leading edge 616 and the maximum thickness plane 622.

FIG. 8 shows one of a plurality of turbine blades 800 included in a turbine engine. As with the airfoil 600 described above and shown in FIG. 6, the turbine blade 800 has a body 810 having an upper surface 812, a lower surface 814 spaced apart from the upper surface 812, and a leading edge 816. However, in the application of the fluidic oscillator 210 in a turbine blade 800, the exiting fluid stream 299 acts as a coolant and flows along the upper surface 812 of the turbine blade 800 to protect the upper surface 812 of the blade 800 from heat. The flowing layer of fluid formed by the oscillating fluid streams 299 exiting the fluidic oscillators 210 creates a protective film between the hot air passing over the turbine blade 800 and the upper surface 812 of the blade 800. Thus, rather than position the fluidic oscillator 210 such that the outlet nozzle 260 is defined by the portion of the upper surface 812 where separation occurs, the outlet nozzle 260 is preferably located close to the leading edge 816 and the suction peak of the turbine blade 800 where the heat is the highest.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

What is claimed is:

1. An out-of-plane feedback-type fluidic oscillator, the fluidic oscillator comprising:
    a first portion, a second portion, a middle portion coupled between the first portion and the second portion, and an axis of curvature, the middle portion comprising:
        a first side, a second side opposite and spaced apart from the first side, and a middle plane, the first side being coupled to the first portion and the second side being coupled to the second portion, wherein the first side, the second side, and the middle plane extend circumferentially around the axis of curvature such that the middle plane is positioned radially outward from the second side and the first side is positioned radially outward from the middle plane, the middle plane being disposed equally distanced from the first side and the second side;
        an interaction chamber having a first attachment wall and a second attachment wall opposite and spaced apart from the first attachment wall,
        a fluid supply inlet for introducing a fluid stream into the interaction chamber,
        an outlet nozzle downstream of the fluid supply inlet, wherein the fluid stream exits the interaction chamber through the outlet nozzle,
        wherein the first side, the second side, and the middle plane are continuously curved around the axis of curvature from the fluid supply inlet to the outlet nozzle; and
        a first feedback channel coupled to the first attachment wall and a second feedback channel coupled to the second attachment wall, the first feedback channel and second feedback channel being in fluid communication with the interaction chamber, each of the first feedback channel and second feedback channel having a first end, a second end opposite and spaced apart from the first end, and an intermediate portion disposed between the first end and second end, wherein the first end is adjacent the outlet nozzle and the second end is adjacent the fluid supply inlet, wherein the first attachment wall and second attachment wall of the interaction chamber are shaped to allow fluid from the fluid stream to flow into the first ends of the first feedback channel and second feedback channel, respectively, causing the fluid stream to oscillate between the first attachment wall and second attachment wall of the interaction chamber such that the fluid stream oscillates as the fluid stream exits the outlet nozzle.

2. The fluidic oscillator of claim 1, wherein the outlet nozzle has a smallest hydraulic diameter, D, and the middle plane has a radius of curvature, R, and a bending angle, $\theta$, wherein $R/D \leq 845.49(\theta)^{-1}$.

3. The fluidic oscillator of claim 1, wherein the middle plane has a bending angle, $\theta$, wherein $15° < \theta < 90°$.

4. The fluidic oscillator of claim 1, wherein the outlet nozzle has a depth measured from the first portion to the second portion and a smallest width measured perpendicular to the depth, wherein the depth is less than or equal to the width but greater than or equal to half of the width.

5. The fluidic oscillator of claim 1, wherein the fluid stream exiting the outlet nozzle oscillates at an oscillation angle of 70 degrees or less.

6. The fluidic oscillator of claim 1, wherein the first side, the second side, and the middle plane have a constant radius of curvature.

7. An airfoil comprising:
    a body having an upper surface, a lower surface opposite and spaced apart from the upper surface, and a leading edge; and
    an out-of-plane feedback-type fluidic oscillator, the fluidic oscillator comprising:
        a first portion, a second portion, a middle portion coupled between the first portion and the second portion, and an axis of curvature, the middle portion comprising:
            a first side, a second side opposite and spaced apart from the first side, and a middle plane, the first side being coupled to the first portion and the second side being coupled to the second portion, wherein the first side, the second side, and the middle plane extend circumferentially around the axis of curvature such that the middle plane is positioned radially outward from the second side and the first side is positioned radially outward from the middle plane, the middle plane being disposed equally distanced from the first side and the second side;
            an interaction chamber having a first attachment wall and a second attachment wall opposite and spaced apart from the first attachment wall,
            a fluid supply inlet for introducing a fluid stream into the interaction chamber,
            an outlet nozzle downstream of the fluid supply inlet, wherein the fluid stream exits the interaction chamber through the outlet nozzle,
            wherein the first side, the second side, and the middle plane are continuously curved around the axis of curvature from the fluid supply inlet to the outlet nozzle; and
            a first feedback channel coupled to the first attachment wall and a second feedback channel coupled to the second attachment wall, the first feedback channel and second feedback channel being in fluid communication with the interaction chamber, each of the first feedback channel and second feedback channel having a first end, a second end opposite and spaced apart from the first end, and an intermediate portion disposed between the first end and second end, wherein the first end is adjacent the outlet nozzle and the second end is adjacent the fluid supply inlet, wherein the first attachment wall and second attachment wall of the interaction chamber are shaped to allow fluid from the fluid stream to flow into the first ends of the first feedback channel and second feedback channel, respectively, causing the fluid stream to oscillate between the first attachment wall and second attachment wall of the interaction chamber such that the fluid stream oscillates as the fluid stream exits the outlet nozzle;

wherein the outlet nozzle is defined by a portion of the upper surface and the fluidic oscillator is positioned such that the fluid stream exiting the outlet nozzle flows over a portion of the upper surface of the body.

8. The airfoil of claim 7, wherein the outlet nozzle has a smallest hydraulic diameter, D, and the middle plane has a radius of curvature, R, and a bending angle, $\theta$, wherein $R/D \leq 845.49(\theta)^{-1}$.

9. The airfoil of claim 7, wherein the middle plane has a bending angle, $\theta$, wherein $15° < \theta < 90°$.

10. The airfoil of claim 7, wherein the outlet nozzle has a depth measured from the first portion to the second portion and a smallest width measured perpendicular to the depth, wherein the depth is less than or equal to the width but greater than or equal to half of the width.

11. The airfoil of claim 7, wherein the fluid stream exiting the outlet nozzle oscillates at an oscillation angle of 70 degrees or less.

12. The airfoil of claim 7, wherein the fluid stream exiting the outlet nozzle oscillates in an oscillation plane, the oscillation plane being at an oscillation plane angle to the portion of the upper surface from which the fluid stream exits the outlet nozzle, wherein the oscillation plane angle is between 10 degrees and 0 degrees.

13. The airfoil of claim 7, wherein the body has trailing edge and a chord line extending between the leading edge and the trailing edge, the body further having a maximum thickness plane perpendicular to the chord line, wherein the portion of the upper surface defining the outlet nozzle is between the leading edge and the maximum thickness plane.

14. The airfoil of claim 7, wherein the fluid stream is supplied to the fluid supply inlet by an air compressor.

15. The airfoil of claim 7, wherein the first side, the second side, and the middle plane have a constant radius of curvature.

16. A turbine comprising:
at least one turbine blade having an upper surface, a lower surface spaced apart from the upper surface, and a leading edge; and
an out-of-plane feedback-type fluidic oscillator, the fluidic oscillator comprising:
a first portion, a second portion, a middle portion coupled between the first portion and the second portion, and an axis of curvature, the middle portion comprising:
a first side, a second side opposite and spaced apart from the first side, and a middle plane, the first side being coupled to the first portion and the second side being coupled to the second portion, wherein the first side, the second side, and the middle plane extend circumferentially around the axis of curvature such that the middle plane is positioned radially outward from the second side and the first side is positioned radially outward from the middle plane, the middle plane being disposed equally distanced from the first side and the second side;
an interaction chamber having a first attachment wall and a second attachment wall opposite and spaced apart from the first attachment wall,
a fluid supply inlet for introducing a fluid stream into the interaction chamber,
an outlet nozzle downstream of the fluid supply inlet, wherein the fluid stream exits the interaction chamber through the outlet nozzle,
wherein the first side, the second side, and the middle plane are continuously curved around the axis of curvature from the fluid supply inlet to the outlet nozzle; and
a first feedback channel coupled to the first attachment wall and a second feedback channel coupled to the second attachment wall, the first feedback channel and second feedback channel being in fluid communication with the interaction chamber, each of the first feedback channel and second feedback channel having a first end, a second end opposite and spaced apart from the first end, and an intermediate portion disposed between the first end and second end, wherein the first end is adjacent the outlet nozzle and the second end is adjacent the fluid supply inlet, wherein the first attachment wall and second attachment wall of the interaction chamber are shaped to allow fluid from the fluid stream to flow into the first ends of the first feedback channel and second feedback channel, respectively, causing the fluid stream to oscillate between the first attachment wall and second attachment wall of the interaction chamber such that the fluid stream oscillates as the fluid stream exits the outlet nozzle;

wherein the outlet nozzle is defined by the upper surface and the fluidic oscillator is positioned such that the fluid stream exiting the outlet nozzle flows over a portion of the upper surface of the at least one turbine blade.

17. The turbine of claim 16, wherein the outlet nozzle has a smallest hydraulic diameter, D, and the middle plane has a radius of curvature, R, and a bending angle, $\theta$, wherein $R/D \leq 845.49(\theta)^{-1}$.

18. The turbine of claim 16, wherein the middle plane has a bending angle, $\theta$, wherein $15° < \theta < 90°$.

19. The turbine of claim 16, wherein the outlet nozzle has a depth measured from the first portion to the second portion and a smallest width measured perpendicular to the depth, wherein the depth is less than or equal to the width but greater than or equal to half of the width.

20. The turbine of claim 16, wherein the fluid stream exiting the outlet nozzle oscillates at an oscillation angle of 70 degrees or less.

21. The turbine of claim 16, wherein the fluid stream exiting the outlet nozzle oscillates in an oscillation plane, the oscillation plane being at an oscillation plane angle to the portion of the upper surface from which the fluid stream exits the outlet nozzle, wherein the oscillation plane angle is between 10 degrees and 0 degrees.

22. The turbine of claim 16, wherein the at least one turbine blade has trailing edge and a chord line extending between the leading edge and the trailing edge, the at least one turbine blade further having a maximum thickness plane perpendicular to the chord line, wherein the portion of the upper surface defining the outlet nozzle is between the leading edge and the maximum thickness plane.

23. The turbine of claim 16, wherein the fluid stream is supplied to the fluid supply inlet by an air compressor.

24. The turbine of claim 16, wherein the first side, the second side, and the middle plane have a constant radius of curvature.

* * * * *